United States Patent [19]

Schulz et al.

[11] 3,809,195

[45] May 7, 1974

[54] MULTIPLE SPEED HUB WITH COASTER BRAKE

[75] Inventors: Horst Schulz; Hans-Joachim Schwerdhofer, both of Schweinfurt am Main; Gunter Look, Grafenrheinfeld, all of Germany

[73] Assignee: Fichtel & Sachs AG, Schweinfurtam Main, Germany

[22] Filed: Feb. 20, 1973

[21] Appl. No.: 333,977

[30] Foreign Application Priority Data
Feb. 29, 1972 Germany.......................... 2209535

[52] U.S. Cl.............................. 192/6 A, 74/750 B
[51] Int. Cl........................ F16d 41/24, F16h 3/44
[58] Field of Search................... 192/6 A; 74/750 B

[56] References Cited
UNITED STATES PATENTS

| | | | |
|---|---|---|---|
| 3,648,809 | 3/1972 | Schwerdhofer | 192/6 A |
| 3,257,868 | 6/1966 | Preece | 192/6 A X |
| 3,122,226 | 2/1964 | Schuller et al. | 192/6 A |
| 3,114,442 | 12/1963 | Schwerdhofer | 192/6 A |

*Primary Examiner*—Samuel Scott
*Assistant Examiner*—Lance W. Chandler
*Attorney, Agent, or Firm*—Hans Berman; Kurt Kelman

[57] ABSTRACT

In a three-speed bicycle hub with internal hub or coaster brake, the transmission ratio between a driver and the hub shell is changed by axially shifting a coupling sleeve angularly secured to the driver between a high-speed position in which a claw coupling connects the sleeve to the planet carrier of planetary gearing in the hub shell, and a normal-speed position in which a double-acting pawl coupling connects the sleeve to the ring gear of the planetary gearing, overrunning clutches being interposed beteen the planet carrier and ring gear respectively and the hub shell. To prevent loss of braking function if the sleeve should accidentally become stuck between its two axial positions, cooperating cams on the pawls and the planet carrier move the pawls relative to the sleeve into the normal-speed position as soon as the claw coupling approaches disengagement.

10 Claims, 10 Drawing Figures

MULTIPLE SPEED HUB WITH COASTER BRAKE

This invention relates to multiple-speed hubs for bicycles and like vehicles, and particularly to a multiple-speed hub equipped with a coaster brake actuated by back-pedalling.

Driving torque and braking torque is provided in a hub of the afore-described type by forward and backward rotation respectively of a driver coaxially mounted in the hub shell, and the transmission ratio between the driver and the hub shell may be changed by a gear transmission in the hub shell, first and second transmission members meshingly connected for simultaneous rotation at different speeds being alternatively coupled to the hub shell. The brake is operatively connected to one of the two transmission members for frictionally engaging the hub shell with the normally stationary shaft of the hub in response to backward rotation of the driver.

In conjunction with overrunning clutches, known hubs are shifted between several transmission ratios by means of a coupling sleeve axially movable relative to the driver, but secured thereto for joint rotation. A manually operated shifting mechanism axially moves the coupling sleeve between positions in which suitable engaging means on the sleeve alternatively couple the sleeve to the first and second transmission members. The two sleeve positions must be spaced sufficiently to prevent clashing of the couplings, and the known hubs necessarily pass, during speed shifting, through a condition in which neither transmission member is engaged by the coupling sleeve. If, by any malfunctioning of the shifting mechanism or of associated elements, the coupling sleeve is stopped in the inoperative axial position, the rider loses control over his vehicle which he can neither propel nor brake.

It is a primary object of this invention to maintain at least the braking function of a multiple-speed hub of the type described regardless of the proper shifting motion of the coupling sleeve.

Devices for achieving this object and for solving the well-known problem have been proposed in German Pat. Nos. 1,425,839 and 1,946,871. The known devices, however, are of complex structure and thus not only costly, but also relatively unreliable, as is inherent in any device having a multiplicity of cooperating moving parts.

Another object of the invention, therefore, is the provision of a wheel hub of the type described which achieves safe brake function under any condition of torque transmission between the driver and the hub shell in a simple manner, using few movable elements conventional in this art, and therefore, available at low cost in good quality.

In one of its apsects, the invention provides first and second coupling means spaced on the driver in a predetermined direction for transmitting torque between the driver and first and second transmission members respectively, as is basically known. Operating means, such as a manually operating shifting mechanism, are provided for jointly moving the two coupling means in the direction of their spacing between a first position in which the first coupling means engages the first transmission member and the second coupling means is unable of transmitting torque to the second transmission member, and a second position in which the second coupling means drivingly engages the second transmission member and the first coupling means is disengaged. The invention further provides coupling control means responsive to incipient disengagement of the first coupling means from the first transmission member by the operating mechanism for moving the second coupling means relative to the first coupling means into torque transmitting engagement with the second transmission member.

In its more specific aspects, the invention employs planetary gearing in the transmission including a sun gear fixedly fastened to the normally stationary hub axis. The aforementioned first and second transmission members constitute the planet carrier and the ring gear of the planetary gearing, and a planet gear mounted on the carrier simultaneously meshes with the sun gear and the ring gear. Two overrunning clutches are interposed between the hub shell and the ring gear and planet carrier respectively for rotating the hub shell when the driver rotates forward. An internal hub brake in the shell is operatively connected to the planet carrier or to the ring gear and responds to backward rotation of the driver for frictionally connecting the hub shell to the shaft.

First and second coupling means are interposed between the driver and the ring gear and planet carrier respectively and engageable for alternatively driving the two members of the planetary gearing at the rotary speed of the driver. A coupling control mechanism responds to disengagement of the first coupling means for immediately engaging the second coupling means if the driver rotates relative to the hub shaft.

Other features, and many of the attendant advantages of this invention will readily be appreciated as the same becomes better understood by reference to the following detailed description of a preferred embodiment when considered in connection with the appended drawing in which.

Figure 1:
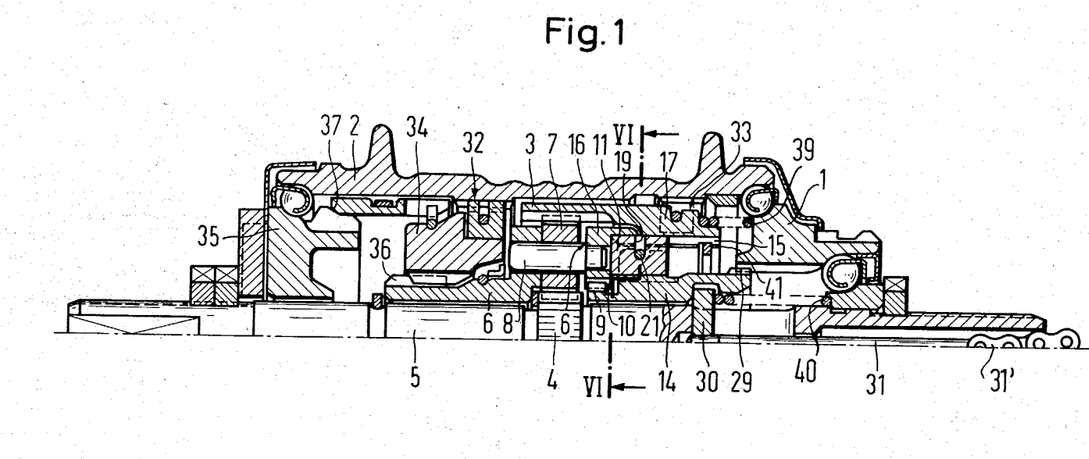
FIG. 1 shows one half of a three-speed bicycle hub of the invention in axial, rear-elevational section, the non-illustrated half being a mirror image of the illustrated portion, and the hub being illustrated in the high-speed position.

Referring now to the drawing in detail, and initially to FIG. 1, there is seen a three-speed hub of the invention equipped with a coaster brake. The hub has a tubular driver 1 coaxially projecting from a hub shell 2 which encloses the remainder of the driver, planetary gearing, the coaster brake, and connecting elements. The projecting part of the driver 1 normally carries a sprocket for connection to the pedals of the bicycle by means of a link chain, as is conventional and not shown.

The planetary gearing includes a ring gear 3 freely rotatable about the hub axis and a sun gear 4 integral with or otherwise fixed on a shaft 5 which is normally stationary, rotatably supports the driver 1, and attaches the illustrated hub to the non-illustrated rear fork of the bicycle. A planet carrier 6 freely rotates about the hub axis on the shaft 5, and two planet gears 7 are rotatably mounted on the carrier 6 by means of respective planet shafts 8, the planet gears 7 simultaneously meshing with the sun gear 4 and with axially elongated, internal teeth or ribs on the ring gear 3.

Motion is transmitted from the driver 1 to the planet gearing by a coupling sleeve 14 freely rotatable about the hub axis on the shaft 5 and axially adjustable by means of a pin 30 which radially projects from a slot in the shaft 5 into an annular recess of the sleeve 14. An axial bore in the shaft accomodates a coaxial pull rod 31 fixedly fastened to the pin 30 and connected to a non-illustrated gear shifting device on the handle bar of the bicycle by a flexible motion transmitting train partly consisting of a link chain 31' and operating against a helical return spring 40.

Short ribs 29 circumferentially distributed on one end of the sleeve 14 are matingly interengaged with long ribs of the driver 1 in all axial positions of the coupling sleeve for joint rotation of the sleeve with the driver. Claws 9 are equiangularly distributed on the other axial end of the sleeve 14 for circumferential abutting engagement with corresponding internal claws 10 on a ring 16 fixedly attached to the planet carrier 6 by the shafts 8. In the illustrated high-speed position of the coupling sleeve 14, the first or claw coupling 9, 10 rotates the planet carrier 6 at the speed of the driver 1.

Figure 8:
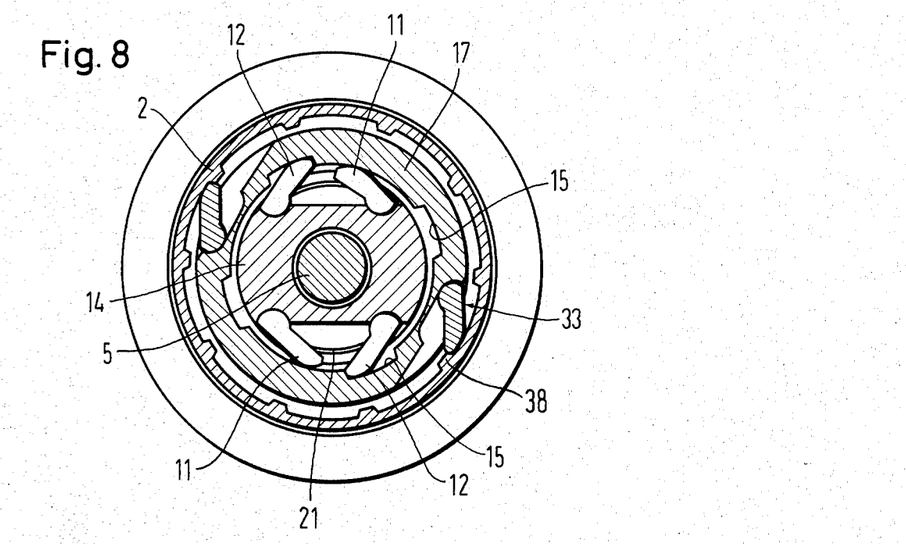
FIG. 8 is a radially sectional view taken on the line VIII — VIII of FIG. 4 in the driving condition of the hub at intermediate speed.
Figure 9:
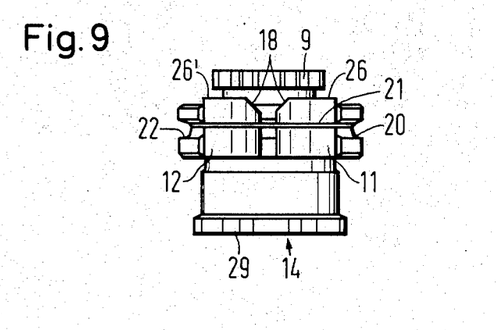
FIG. 9 is a top plan view of a coupling sleeve and of associated elements in the bicycle hub of FIG. 1.
Figure 10:
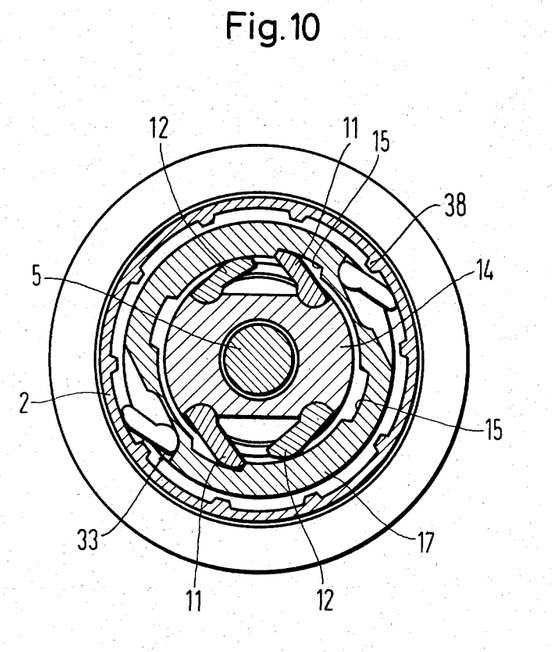
FIG. 10 shows the device of FIG. 8 in the braking condition.

As is better seen in FIGS. 8 to 10, two brake pawls 11 and two identical drive pawls 12 are pivotally arranged in pockets of the sleeve 14 in a common radial plane and are biased by a common pawl spring 21 of steel wire toward a position in which their radially tapering engaging heads project radially outward of the pockets. The pawl spring 21 is received in respective circumferential grooves 19 of the pawls 11, 12, and extends in an open circle about the hub axis, the diameter of the circle being greater than the diameter of the spring in the fully relaxed condition. Its axial movement is limited by engagement with radial walls of the sleeve 14 in oversized circumferential groove sections 20 of the sleeve 14. The bottom 22 of each groove section 20 flares conically toward the ribs 29 so that the pawls 11, 12 are biased by the spring 21 toward the axial position illustrated in FIG. 9 in which the pawl spring 21 is contracted to its smallest diameter in the deepest portions of the groove sections 20. The radial faces 26, 26' of the pawls 11, 12 axially directed toward the claws 9 have bevels 18 so that the engaging heads of the pawls taper axially toward their free ends. The engaging heads of the brake pawls 11 are directed counterclockwise, as viewed in FIGS. 8 and 10, and those of the drive pawls 12 clockwise. The pawls 11, 12 alternate circumferentially.

Figures 4, 5:
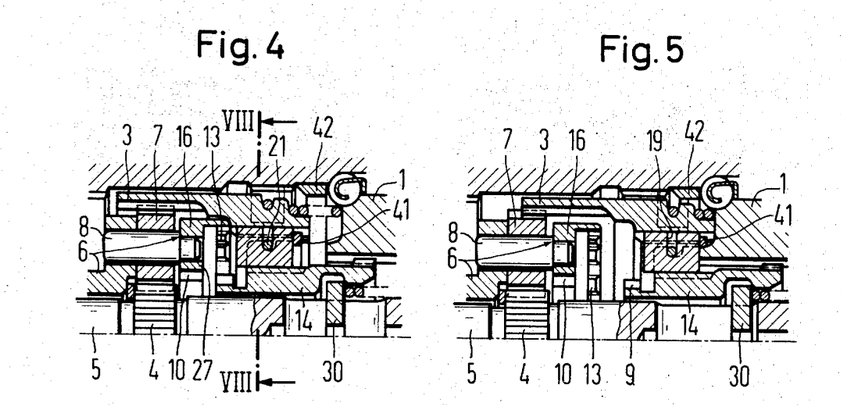

An annular portion 17 of the ring gear 3 axially projects beyond the planet gears 7 toward the driver 1 and has a smaller inner diameter than the pitch circle of the ring gear. It carries the pawls 33 of an overrunning clutch also including a ratchet rim 38 on the hub shell 2 (FIGS. 8, 10). The ring gear 3 is biased toward the axial position shown in FIG. 1 by a helical compression spring 39. When the ring gear moves toward the driver 1 against the restraint of the spring 39, a conical face of a disengaging ring 42 fastened to the inner wall of the shell 2 retracts the pawls 33 and disengages the clutch 33, 38. Movement of the ring gear 3 into the clutch-disengaging, axially terminal position shown in FIG. 5 is brought about by an internal flange or abutment ring 41 on the axial end of the ring gear portion 17 nearest the driver 1, as will presently be described. Meshing engagement between the planet gears 7 and the ring gear 3 is maintained in all axial positions of the latter.

The ring gear portion 17 envelops at least portions of the pawls 11, 12 in all axial positions of the coupling sleeve 14 and the ring gear 3, and it has four internal axial grooves or recesses 15 which are equiangularly spaced about the hub axis. Radial end walls of the grooves 15 may be engaged by the pawls 11, 12 for turning the ring gear unless the latter turns faster than the pawls engaged in the recesses. The pawls 11, 12 jointly with the internally grooved ring gear portion 17 thus provide an overrunning second coupling for transmitting torque between the coupling sleeve 14 and the planetary gearing.

Figure 6:
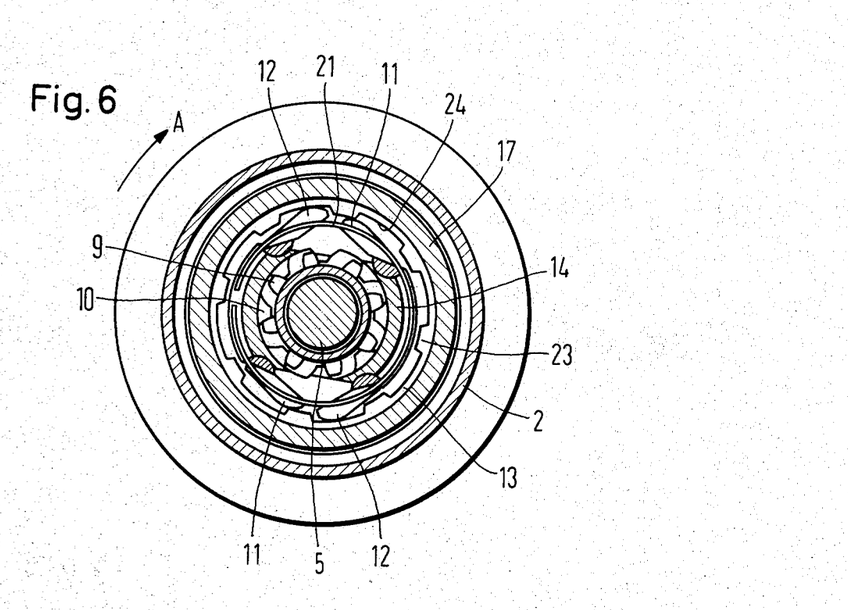
FIG. 6 shows the hub of FIG. 1 in radial section on the line VI — VI in the driving condition.

The ring 16 on the planet carrier 6 carries a control rim 13 axially offset from the body 27 of the ring 16 toward the driver 1. The rim 13 has wide, internal teeth 23 circumferentially separated by even wider gaps 24. As is best seen in FIG. 6, there are eight teeth 23 on the rim 13 and eight claws 10 on the ring 16. The inner diameter of the rim 13, as measured across the gaps 24, is equal to the inner diameter of the ring gear portion 17, as measured across the recesses 15. Each tooth 23 is offset from the angularly nearest claw 10 approximately 13° (10° to 15°), center-to-center, in the direction of forward hub rotation indicated by an arrow A in FIG. 6. The gaps which separate the claws 9 from each other, and the corresponding gaps between the claws 10 are about twice as wide in a circumferential direction as the claws separated by the gaps.

The pawls 11, 12 are mounted on the coupling sleeve 14 in such a manner that an axial plane of symmetry drawn through the hub axis between adjacent pawls 11, 12 bisects the gap between two adjacent claws 9.

In the high-speed driving condition of the hub illustrated in FIGS. 1 and 6, the drive pawls 12 are partly received in the gaps 24 of the control rim 13 and partly in the recesses 15 of the ring gear. Torque is being transmitted from the coupling sleeve 14 by the first or claw coupling 9, 10 to the planet carrier 6 so that the pawls 12 and the control rim 13 rotate at the same speed, and no significant torque can be transmitted from the pawls to the rim. The ring gear part 17 overtravels the pawls 12 at the higher speed transmitted to the ring gear 3 from the planet carrier 6 by the planet wheels 7. The brake pawls 11 are held in a retracted position by the teeth 23 of the control rim and do not interfere with rotation of the ring gear portion 17.

During forward pedalling in the high-speed condition of the hub, as illustrated in FIGS. 1 and 6, torque is transmitted from the driver 1 to the hub shell 2 by the coupling sleeve 14, the first or claw coupling 9, 10, the pawl carrier 6, the planet gears 7, the ring gear 3, and the overrunning clutch 33, 38. The two axial ends of the hub shell are rotatably supported on the driver 1 and on an annular bearing member 35 fixedly mounted on the shaft 5. The second coupling 11, 12, 17 is idle.

A tubular portion of the planet carrier 6 rotatably engaging the shaft 5 projects from the planet gears 7 toward the bearing member 35 and is connected by coarse threads 36 with a brake cone 34. Spring-loaded pawls 32 on the brake cone 34 cooperate with a ratchet rim on the inner face of the hub shell 2 in the manner more fully illustrated in connection with the overrunning clutch 33, 38. Frictional engagement between the pawls 32 and the hub shell 2 holds the brake cone 34 in its illustrated axial position on the axially fixed planet carrier 6 as long as the latter rotates in a forward direction so that the second overrunning clutch represented in the drawing by the pawls 32 can transmit torque from the planet carrier 6 to the hub shell 2 unless the latter rotates faster than the pawls 32.

An axially slotted brake sleeve 37 is arranged adjacent the coaxial inner wall of the shell 2 between respective conical surfaces of the cone 34 and of the bearing member 35 so as to be expanded radially when the cone moves toward the bearing member on the threads 36, and thereby frictionally to couple the hub shell 2 to the stationary shaft 5, as is conventional in internal hub brakes.

Figure 7:
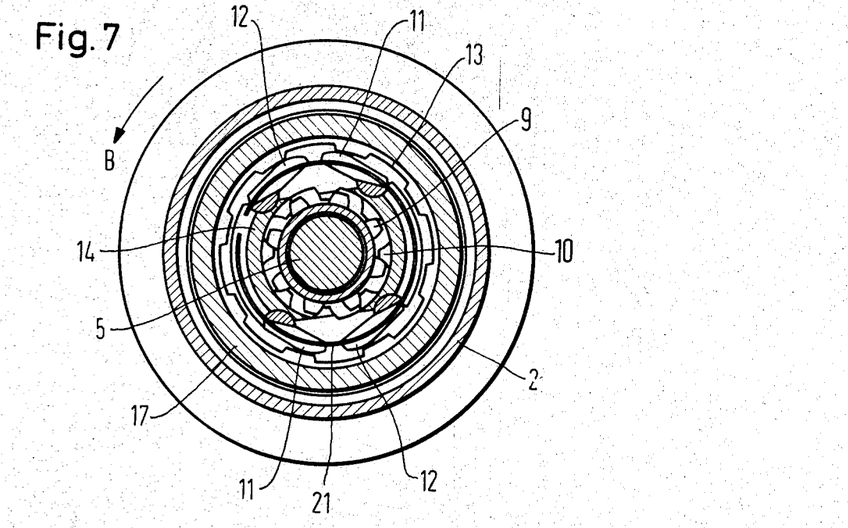
FIG. 7 illustrates the device of FIG. 6 in the braking condition.

During back-pedalling, the coupling sleeve 14 is displaced angularly in the direction indicated in FIG. 7 by the arrow B. The claws 9 on the sleeve which abutted in a clockwise direction against the claws 10 of the planet carrier 6 in the driving condition of FIG. 6 are shifted into a position of counterclockwise, abutting engagement through the gap between adjacent claws 10 whose width is about twice the width of the claw 9. There is some lost motion between the coupling sleeve 14 and the planet carrier 6 during the initial phase of back-pedalling, and corresponding relative movement between the pawls 11, 12 on the coupling sleeve 14 and the control rim 13 on the planet carrier 6.

The drive pawls 12 received in the gaps 24 of the control rim 13 during forward pedalling are retracted by the teeth 23 during the lost motion displacement of the sleeve 14 relative to the planet carrier 6, and the drive pawls 12 are correspondingly retracted from the recesses 15 in the ring gear portion 17 so that they cannot interfere with backward rotation of the ring gear at a higher speed than that of the planet carrier 6. The brake pawls 11 remain in the retracted position under teeth 23 in which they were shown in FIG. 6.

The planet carrier 6 is rotated backwards by the first coupling 9, 10 without interference from the second or pawl coupling 11, 12, 17, and the frictional engagement of the pawls 32 with the hub shell 2 causes the brake cone 34 to move away from the planet gears 7 and to spread the brake sleeve 37 for braking the hub shell 2.

When the coupling sleeve 14 is moved during forward bicycle movement toward the right from the position illustrated in FIG. 1 by the operator manipulating the non-illustrated gear-shifting mechanism, the claws 9 are gradually withdrawn from the claws 10, and simultaneously, the pawls 11, 12 are shifted outward of the rim 13 and inward of the ring gear portion 17, the drive pawls 12 being in their operative positions, and the brake pawls 11 remaining retracted.

Figure 2:
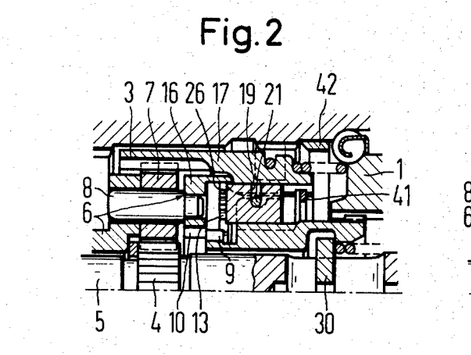
FIGS. 2 to 5 illustrate a part of the apparatus of FIG. 1 during consecutive gear shifting steps leading through an intermediate-speed to a low-speed position.
Figure 3:
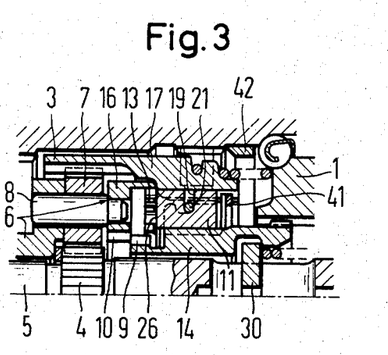

The normal axial spacing of the claws 9 and of the pawls 11, 12 on the coupling sleeve 14 is such that the claws 9 are disengaged from the claws 10 on the planet carrier 6 when only the bevels 18 of the drive pawls 12 are within range of the teeth 23, as is illustrated in FIG. 2. As soon as torque starts being transmitted from the pawls 12 to the ring gear portion 17, camming engagement between the slower-moving teeth 23 and the bevels 18 on the pawls 12 causes the latter to shift axially toward the driver 1 and out of the control rim 13 relative to the coupling sleeve 14 against the biasing force of the pawl spring 21 which is being expanded as it moves axially with the pawls 12 and takes the pawls 11 along. At the very moment when contact between the claws 9, 10 is lost, the pawls 12 are ready to transmit all driving torque between the coupling sleeve 14 and the ring gear portion 17, as is shown in FIG. 3.

The gear shifting movement of the coupling sleeve 14 continues until a click stop or the like in the non-illustrated manual gear shifting mechanism is engaged in the intermediate-speed position of the hub illustrated in FIG. 4 in which the claws 9 are safely spaced from the claws 10 of the disengaged first coupling, and the pawls 11, 12 are contiguously adjacent the inner flange 41 on the ring gear portion 17, while the spring 21 has returned to the position shown in FIG. 9.

As is shown in FIG. 8, the drive pawls 12 engage radial walls of the recesses 15 for transmitting driving torque to the ring gear 3. The overrunning clutch 33, 38 drives the hub shell 2 at the speed of the driver 1, and the brake pawls 11 are retracted by lands of the ring gear portion 17 between the recesses 15. The planet carrier 6 idles at a slower speed than that of the ring gear 3, and its pawls 32 are overtravelled by the hub shell 2.

During back-pedalling in the intermediate-speed condition of the hub, the brake pawls 11 engage the ring gear portion 17 in respective recesses 15, as is shown in FIG. 10, while the drive pawls 12 are retracted, and the rearward movement of the ring gear 3 is transmitted to the planet carrier 6 by the planet gears 7 for shifting the brake cone 34 in the manner described above. Both overrunning clutches 32, 33, 38 are overtravelled by the hub shell 2 until the brake is fully engaged.

When the coupling sleeve 14 is further shifted from the intermediate-speed position toward the driver 1 by means of the non-illustrated gear-shifting mechanism into the position illustrated in FIG. 5, the pawls 11, 12 retain their driving cooperation with the ring gear portion 17, but faces of the pawls located in a common radial plane axially shift the ring gear 3 by means of the abuttingly engaged flange 41 toward the right until the ring 42 disengages the overrunning clutch 33, 38 between the ring gear 3 and the hub shell 2.

Driving torque is now being transmitted from the driver 1 by the coupling sleeve 14, the pawls 12, the ring gear 3, the planet gears 7, the planet carrier 6, and the pawl clutch 32 to the hub shell 2 which is rotated at a speed slower than the input speed of the driver 1. The coaster brake is operated during back-pedalling in the low-speed condition as described with reference to the intermediate-speed condition of the hub.

When the tension in the chain 31' is relaxed by the manual gear-shifting mechanism, the coupling sleeve 14 is moved toward the bearing member 35 by the spring 40, permitting return of the ring gear 3 to the position shown in FIGS. 1 to 4, and the intermediate speed position is resumed first. Further leftward movement of the coupling sleeve 14, as viewed in FIGS. 1 to 4, causes entry of the pawls 11, 12 into the rim 13. Axial clashing of the radial pawl faces 26, 26' with the rim 13 is prevented by the axially resilient mounting of the pawls on the coupling sleeve 14 and the cam bevels 18 which facilitate insertion of the pawls into the rim 13.

While the invention has been described with reference to a three-speed transmission, its essential novel features are equally applicable to a vehicle hub having fewer or more transmission ratios. The illustrated embodiment may be modified in an obvious manner to interchange the claw coupling 9, 10 and pawl coupling 11, 12, 17. Furthermore, the braking and driving functions of the pawl coupling may be separated, and the driving function assigned to a second claw coupling which is engaged only after the illustrated coupling 9, 10 is safely disengaged. While the illustrated dual-action coupling has obvious advantages of low cost and compactness, its primary advantage resides in the fact that it makes the hub ready for braking immediately upon release of the claw coupling 9, 10, and makes it impossible for the transmission to become stuck accidentally in a position between two speeds in which the rider of the bicycle can neither accelerate nor stop the bicycle. The invention thus encompasses modifications in which acceleration may not be available in the event of malfunctioning of the transmission, but the rider's safety is still assured by a functioning coaster or internal hub brake.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A multiple speed hub comprising, in combination:
   a. a shaft having an axis;
   b. a hub shell rotatable about said axis;
   c. a driver rotatable about said axis in a forward and in a backward direction;
   d. planetary gearing in said shell including a sun gear fixedly fastened to said shaft, a planet carrier member and a ring gear member rotatable about said axis, a planet gear mounted on said carrier member for rotation in simultaneous meshing engagement with said sun gear and with said ring gear member;
   e. two overrunning clutches interposed between said hub shell and said members respectively for rotating said hub shell when said driver rotates in a forward direction;
   f. an internal hub brake in said shell operatively connected to one of said members and responsive to backward rotation of said driver for frictionally connecting said hub shell to said shaft;
   g. first and second coupling means interposed between said driver and said members respectively and engageable for alternatively driving said members at the rotary speed of said driver; and
   h. coupling control means responsive to the disengagement of said first coupling means during rotation of said driver for immediately engaging said second coupling means.

2. A hub as set forth in claim 1, wherein said first and second coupling means jointly include a coupling sleeve connected to said driver for joint rotation about said axis, operating means for axially moving said coupling sleeve, and respectively include two couplings interposed between said coupling sleeve and said members, said couplings being axially spaced.

3. A hub as set forth in claim 2, wherein the coupling of said first coupling means is a claw coupling including cooperating respective sets of claws on said coupling sleeve and on one of said members, said claws being engaged and disengaged by said axial moving of said coupling sleeve, and the coupling of said second coupling means is a pawl coupling.

4. A hub as set forth in claim 3, wherein said pawl coupling includes engaging means on said other member, a brake pawl having an engaging head and mounted on said coupling sleeve for limited axial movement and for radial movement toward and away from an operative position in which said head may engage said engaging means, said coupling control means including first retracting means holding said brake pawl out of said operative position while said driver rotates in a forward direction, second retracting means holding said brake pawl out of said operative position while said claw coupling is engaged, first cam means axially secured to said brake pawl, and second cam means in an axially fixed position, said first and second cam means engaging each other for moving said brake pawl axially away from said claw coupling and for thereby inactivating said second retracting means when said claw coupling is about to be disengaged by said axial movement of said coupling sleeve while said driver rotates.

5. A hub as set forth in claim 4, wherein said second cam means are mounted on said one member.

6. A hub as set forth in claim 5, wherein said second retracting means include a control ring mounted on said one member and having circumferentially spaced teeth directed toward said axis for engagement with said brake pawl.

7. A hub as set forth in claim 5, wherein said one member is said planet carrier, and said other member is said ring gear.

8. A hub as set forth in claim 5, wherein said pawl coupling further includes a drive pawl mounted on said coupling sleeve for joint axial movement with said brake pawl and having an engaging head, said first biasing means biasing said drive pawl toward an operating position in which said head of the drive pawl may engage said engaging means, said coupling control means including retracting means for holding said drive pawl out of the operating position thereof when said driver rotates in said backward direction.

9. A hub as set forth in claim 8, wherein the claws in each of said sets are circumferentially spaced from each other so as to form gaps therebetween, the claws of each set being received in the gaps of the other set with circumferential clearance when said claw coupling is engaged, whereby there is lost motion in siad claw coupling when the direction of rotation of said driver is reversed, said first retracting means responding to said lost motion for holding and for releasing said brake pawl and said drive pawl.

10. In a hub for a bicycle and like vehicle having a shaft, a hub shell and a driver member rotatable about the axis of said shaft, a gear transmission operatively interposed between said driver member and said hub shell for transmitting torque therebetween when said driver member rotates in a forward direction, said transmission having first and second transmission members meshingly connected for simultaneous rotation at different speeds, brake means operatively connected to one of said transmission members for frictionally coupling said shell to said shaft in response to backward rotation of said driver member, and shifting means for shifting the transmission ratio of said transmission by alternatively coupling said hub shell to said two transmission members for joint rotation, the improvement in the shifting means which comprises:

a. first and second coupling means spaced on said driver member in a predetermined direction for transmitting torque between said driver member and said transmission members respectively;

b. operating means for jointly moving said first and second coupling means in said direction between a first position in which said first coupling means engages said first transmission member and said second coupling means is unable of transmitting torque to said second transmission member, and a second position in which said second coupling means drivingly engages said second transmission member and said first coupling means is disengaged from said first transmission member; and c. coupling control means responsive to incipient disengagement of said first coupling means from said first transmission member by said operating means for moving said second coupling means in said direction relative to said first coupling means into torque transmitting engagement with said second transmission member.

* * * * *